US009362590B2

(12) United States Patent
Shinmei et al.

(10) Patent No.: US 9,362,590 B2
(45) Date of Patent: Jun. 7, 2016

(54) LITHIUM ION SECONDARY BATTERY

(75) Inventors: Kenichi Shinmei, Tsukuba (JP); Masashi Kanoh, Tsukuba (JP); Rasika Dasanayake Aluthge, Tsukuba (JP); Masaru Heishi, Tsukuba (JP); Takahito Itoh, Tsu (JP)

(73) Assignees: SEKISUI CHEMICAL CO., LTD., Osaka (JP); MIE UNIVERSITY, Mie (JP)

( * ) Notice: Subject to any disclaimer, the term of this patent is extended or adjusted under 35 U.S.C. 154(b) by 108 days.

(21) Appl. No.: 13/977,228

(22) PCT Filed: Oct. 18, 2011

(86) PCT No.: PCT/JP2011/073927
§ 371 (c)(1),
(2), (4) Date: Jun. 28, 2013

(87) PCT Pub. No.: WO2012/090575
PCT Pub. Date: Jul. 5, 2012

(65) Prior Publication Data
US 2013/0273436 A1    Oct. 17, 2013

(30) Foreign Application Priority Data
Dec. 28, 2010  (JP) .................................. 2010-293794

(51) Int. Cl.
| H01M 10/056 | (2010.01) |
| H01B 1/12 | (2006.01) |
| H01M 10/0525 | (2010.01) |
| H01M 10/0565 | (2010.01) |
| H01M 10/0567 | (2010.01) |
| H01M 10/0568 | (2010.01) |

(52) U.S. Cl.
CPC ............. *H01M 10/056* (2013.01); *H01B 1/122* (2013.01); *H01M 10/0525* (2013.01); *H01M 10/0565* (2013.01); *H01M 10/0567* (2013.01); *H01M 10/0568* (2013.01); *Y02E 60/122* (2013.01)

(58) Field of Classification Search
None
See application file for complete search history.

(56) References Cited

U.S. PATENT DOCUMENTS

| 2005/0031937 A1* | 2/2005 | Akashi et al. .................... 429/62 |
| 2006/0236528 A1* | 10/2006 | Xu et al. ....................... 29/623.1 |
| 2007/0054184 A1* | 3/2007 | Yong et al. ..................... 429/144 |

(Continued)

FOREIGN PATENT DOCUMENTS

| CN | 101202353 A | 6/2008 |
| JP | 10-050345 | 2/1998 |

(Continued)

OTHER PUBLICATIONS

Japanese office action in 2013-210597, dated Jan. 14, 2014 along with an English translation thereof.

(Continued)

*Primary Examiner* — Patrick Ryan
*Assistant Examiner* — Wyatt McConnell
(74) *Attorney, Agent, or Firm* — Greenblum & Bernstein, P.L.C.

(57) ABSTRACT

A lithium ion secondary battery is provided, including: a positive electrode and a negative electrode into which, and from which, lithium ions can be introduced and be discharged reversibly, and an electrolyte membrane placed therebetween, wherein the electrolyte membrane is obtained using an electrolyte made by blending (A) a polyanion type lithium salt, (B) a boron compound, and (C) an organic solvent.

15 Claims, 1 Drawing Sheet

(56) References Cited

U.S. PATENT DOCUMENTS

| | | | |
|---|---|---|---|
| 2009/0017386 A1* | 1/2009 | Xu et al. | 429/331 |
| 2009/0035662 A1* | 2/2009 | Scott et al. | 429/231.5 |
| 2009/0111012 A1* | 4/2009 | Shibuya et al. | 429/163 |
| 2009/0269654 A1* | 10/2009 | Kairawicz et al. | 429/56 |
| 2009/0325076 A1* | 12/2009 | Matsui et al. | 429/326 |
| 2010/0124708 A1* | 5/2010 | Matsui et al. | 429/332 |
| 2010/0221605 A1* | 9/2010 | Schumann et al. | 429/207 |
| 2011/0008685 A1* | 1/2011 | Fujinami et al. | 429/345 |

FOREIGN PATENT DOCUMENTS

| | | |
|---|---|---|
| JP | 2000-021448 | 1/2000 |
| JP | 2006-318674 | 11/2006 |
| JP | 2008-218404 | 9/2008 |
| JP | 2010/529628 | 8/2010 |
| JP | 2011/040333 | 2/2011 |
| WO | WO2008/032795 * | 3/2008 |
| WO | 2008/151902 | 12/2008 |

OTHER PUBLICATIONS

Patrick E. Trapa et al., "Synthesis and Characterization of Single-Ion Graft Copolymer Electrolytes", Journal of the Electrochemical Society, Oct. 13, 2005, pp. vol. 152, pp. A2281-A2284.

International Search Report issued Jan. 24, 2012 in PCT/JP2011/073927 in English.

Chinese Office Action issued with respect to application No. 201180062677.2, mail date is Jun. 4, 2015.

* cited by examiner

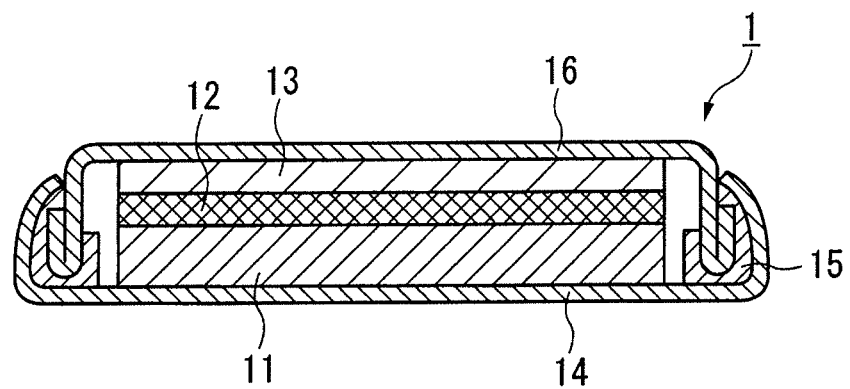

LITHIUM ION SECONDARY BATTERY

TECHNICAL FIELD

The present invention relates to a lithium ion secondary battery.

Priority is claimed on Japanese Patent Application No. 2010-293794, filed Dec. 28, 2010, the content of which is incorporated herein by reference.

BACKGROUND ART

Lithium ion secondary batteries have characteristics of having higher energy density and electromotive force than lead storage batteries and nickel hydride batteries, and thus are widely used as a power source of portable phones, notebook PCs, or the like which require reductions in size and weight. In addition, among the lithium ion secondary batteries, those that use a nonaqueous electrolytic solution in which lithium salts are dissolved in an organic solvent as an electrolyte are the mainstream.

However, the secondary battery that uses the nonaqueous electrolytic solution has a possibility of degradation of charging and discharging cycle life-span characteristics caused by volatilization and diffusion and liquid leakage, and has a risk of internal short circuit caused by precipitation of dendrite that grows in a direction from the negative electrode to the positive electrode. Therefore, in the worst case, the secondary battery may be a cause of accidental fire. In recent years, applying the lithium ion secondary battery to a large-size stationary power source for power storage or a power source for an electric vehicle has been expected, and a further increase in energy density and enhancement in safety are strongly desired.

Here, a system which uses a solid or gel-like electrolyte as an electrolyte has been designed and actively studied. Using such an electrolyte, volatilization and diffusion of an electrolytic solution or liquid leakage is prevented. Therefore, reliability and safety of the battery can be enhanced. Moreover, a reduction in the thickness and lamination of the electrolyte itself become easy, and thus enhancement in processability and simplification of packages are expected.

As the gel-like electrolyte, for example, a fluorine-based polymer such as polyvinylidene fluoride and a polyacrylic polymer such as polymethyl(meth)acrylate are used.

In addition, examples of a lithium salt that is used in combination with the polymers include lithium hexafluorophosphate ($LiPF_6$), lithium tetrafluoroborate ($LiBF_4$), lithium bis(trifluoromethylsulfonyl)imide ($LiN(SO_2CF_3)_2$), lithium hexafluorophosphate ($LiPF_6$), lithium perchlorate ($LiClO_4$), lithium tetrafluoroborate ($LiBF_4$), lithium trifluoromethanesulfonate ($LiCF_3SO_3$), lithium hexafluoroantimonate ($LiSbF_6$), lithium hexafluoroarsenate ($LiAsF_6$), and lithium tetraphenylborate ($LiB(C_6H_5)_4$).

In the lithium ion secondary battery, lithium salts demand characteristics such as high chemical stability and thermal stability and low cost. However, it is very difficult to satisfy all the demands. For example, $LiPF_6$ used in the battery of a commercially available product has problems of low thermal stability and easily being hydrolyzed, and $LiN(SO_2CF_3)_2$ has problems of high cost.

Meanwhile, a method of applying a polymer composite (polyanion type lithium salt) which has a lithium salt as an anionic functional group in a polymer and has functions of both a polymer matrix and the lithium salt to the lithium ion secondary battery has been suggested (refer to PTLs 1 and 2).

CITATION LIST

Patent Literature

[PTL 1] Japanese Unexamined Patent Application, First Publication No. H10-050345
[PTL 2] Japanese Unexamined Patent Application, First Publication No. 2006-318674

SUMMARY OF INVENTION

Technical Problem

However, in the polyanion type lithium salt according to the related art, the dissociation degree of lithium ions is not necessarily sufficient, and it is desirable to develop a lithium ion secondary battery having sufficient battery performance.

The present invention has been made taking the foregoing circumstances into consideration, and an object thereof is to provide a lithium ion secondary battery which uses a polyanion type lithium salt and has sufficient battery performance.

Solution to Problem

In order to accomplish the object, the present invention provides a lithium ion secondary battery including: a positive electrode and a negative electrode into which, and from which, lithium ions can be introduced and be discharged reversely, and an electrolyte membrane disposed therebetween, wherein the electrolyte membrane is obtained using an electrolyte made by blending (A) a polyanion type lithium salt, (B) a boron compound, and (C) an organic solvent.

In the lithium ion secondary battery of the present invention, it is preferable that (B) the boron compound be one or more types selected from the group consisting of a boron trifluoride-alkyl ether complex and a boron trifluoride-alcohol complex.

In the lithium ion secondary battery of the present invention, it is preferable that (A) the polyanion type lithium salt be one or more types selected from the group consisting of a lithium salt of a polycarboxylic acid and a lithium salt of a polysulfonic acid.

In the lithium ion secondary battery of the present invention, it is preferable that (A) the polyanion type lithium salt be one or more types selected from the group consisting of poly(lithium 2-acrylamido-2-methyl-1-propanesulfonate), poly(lithium styrenesulfonate), poly(lithium vinyl sulfonate), poly(lithium perfluorosulfonate), poly(lithium (meth)acrylate), lithium polymaleate, lithium polyfumarate, lithium polymuconate, lithium polysorbate, a polyacrylonitrile-butadiene-lithium acrylate) copolymer, a poly(tert-butylacrylate-ethyl acrylate-lithium methacrylate) copolymer, a poly(ethylene-lithium acrylate) copolymer, and a poly(methyl methacrylate-lithium methacrylate) copolymer.

In the lithium ion secondary battery of the present invention, the electrolyte may further be blended with (D) a matrix polymer.

In the lithium ion secondary battery of the present invention, it is preferable that (D) the matrix polymer be one or more types selected from the group consisting of a polyether-based polymer, a fluorine-based polymer, a polyacrylic polymer, polyacrylonitrile, polyphosphazene, and polysiloxane.

In the lithium ion secondary battery of the present invention, it is preferable that (D) the matrix polymer be one or more types selected from the group consisting of polyethylene oxide, polypropylene oxide, polyvinyl fluoride, polyvinylidene fluoride, a polyvinylidene fluoride-hexafluoropropylene copolymer, a polyvinylidene fluoride-hexafluoroacetone copolymer, polytetrafluoroethylene, polyacrylonitrile, polyphosphazene, and polysiloxane.

In the lithium ion secondary battery of the present invention, it is preferable that (C) the organic solvent be one or more types selected from the group consisting of a carbonic ester compound, a lactone compound, and a sulfone compound.

In the lithium ion secondary battery of the present invention, it is preferable that (C) the organic solvent be one or more types selected from the group consisting of ethylene carbonate, propylene carbonate, butylene carbonate, dimethyl carbonate, methyl ethyl carbonate, diethyl carbonate, γ-butyrolactone, and sulfolane.

Advantageous Effects of Invention

According to the present invention, a lithium ion secondary battery which uses a polyanion type lithium salt and has sufficient battery performance can be provided.

BRIEF DESCRIPTION OF DRAWING

FIG. 1 is a diagram illustrating an embodiment of a lithium ion secondary battery of the present invention.

The electrolyte membrane of the present invention has a high ion conductivity of equal to or higher than $1.5 \times 10^{-4}$ S/cm at room temperature, which is required when being applied to the lithium ion secondary battery. By further controlling the blending, a high ion conductivity of equal to or higher than $1.0 \times 10^{-3}$ S/cm is obtained.

Moreover, the electrolyte membrane of the present invention has an extremely excellent lithium ion transference number of preferably equal to or higher than 0.3, and more preferably, equal to or higher than 0.5 at, for example, 25° C.

As described above, the electrolyte membrane of the present invention has an ion conductivity equal to the gel electrolyte and is excellent also in the lithium ion transference number. Therefore, for example, in the application to the lithium ion secondary battery, movement of lithium ions is accelerated during charging and discharging, and movement of counter anions is suppressed on one side. Therefore, even when charging and discharging are performed with high current, the concentration polarization of anions on the electrode is suppressed, and thus degradation of battery performance due to an increase in resistance is suppressed. In addition, the electrolyte membrane of the present invention is mostly gel-like, and thus degradation of charging and discharging cycle life-span characteristics caused by volatilization and diffusion of the electrolytic solution and liquid leakage, internal short circuit are suppressed. Therefore, an increase in energy density is possible, and safety is high. Moreover, a reduction in thickness and lamination of the electrolyte membrane are easy, and thus enhancement in processability and simplification of packages are possible.

DESCRIPTION OF EMBODIMENTS

The lithium ion secondary battery of the present invention is a lithium ion secondary battery in which an electrolyte membrane is placed between a positive electrode and a negative electrode into which, and from which, lithium ions can be introduced and be discharged reversibly, and the electrolyte membrane is obtained using an electrolyte made by blending (A) a polyanion type lithium salt, (B) a boron compound, and (C) an organic solvent.

In the lithium ion secondary battery of the present invention, since (B) the boron compound is also used in the electrolyte, the dissociation degree of lithium ions of (A) the polyanion type lithium salt is high, and ion conductivity is excellent, thereby providing sufficient battery performance.

<Electrolyte>

[(A) Polyanion Type Lithium Salt]

(A) The polyanion type lithium salt is not particularly limited, and any of those which include a plurality of anion portions and lithium cations (lithium ions, $Li^+$) that form salts with the anion portions in a polymer structure can be appropriately used. Preferable examples thereof include those that include a plurality of parts which are lithium salts of an acid, and examples of the acid include a carboxylic acid and a sulfonic acid.

That is, preferable examples of (A) the polyanion type lithium salt include a lithium salt of a polycarboxylic acid and a lithium salt of a polysulfonic acid.

Preferable examples of the lithium salt of a polycarboxylic acid include poly(lithium(meth)acrylate), lithium polymaleate, lithium polyfumarate, lithium polymuconate, lithium polysorbate, a poly(acrylonitrile-butadiene-lithium acrylate) copolymer, a poly(tert-butylacrylate-ethyl acrylate-lithium methacrylate) copolymer, a poly(ethylene-lithium acrylate) copolymer, and a poly(methyl methacrylate-lithium methacrylate) copolymer. In addition, in the specification, "(meth) acrylic acid" indicates both "acrylic acid" and "methacrylic acid".

Preferable examples of the lithium salt of a polysulfonic acid include poly(lithium 2-acrylamido-2-methyl-1-propanesulfonate), poly(lithium styrenesulfonate), poly(lithium vinyl sulfonate), and poly(lithium perfluorosulfonate). Examples of poly(lithium perfluorosulfonate) include poly(lithium perfluoroalkene sulfonate) and one expressed by the following general formula (I).

[Chem. 1]

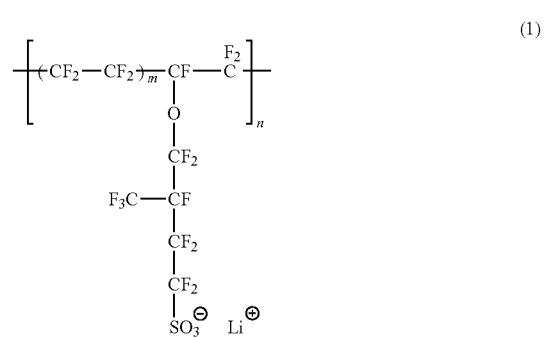

(in the formula, m and n are each independently an integer of equal to or higher than 1)

As (A) the polyanion type lithium salt, one type may be used alone, or two or more types may be used in combination. When two or more types are used in combination, the combination and ratio thereof may be appropriately selected depending on the purpose.

In the present invention, it is preferable that (A) the polyanion type lithium salt be one or more types selected from the group consisting of the lithium salt of the polycarboxylic acid and the lithium salt of the polysulfonic acid.

As (A) the polyanion type lithium salt, one type may be used alone, or a lithium salt that does not correspond to the polyanion type lithium salt may be used in combination. As such a lithium salt, specifically, for example, lithium bis(trifluoromethylsulfonyl)imide (LiN(SO$_2$CF$_3$)$_2$), lithium hexafluorophosphate (LiPF$_6$), lithium perchlorate (LiClO$_4$), lithium tetrafluoroborate (LiBF$_4$), lithium trifluoromethanesulfonate (LiCF$_3$SO$_3$), lithium hexafluoroantimonate (LiSbF$_6$), lithium hexafluoroarsenate (LiAsF$_6$), and lithium tetraphenylborate (LiB(C$_6$H$_5$)$_4$) may be exemplified.

In the case where two or more types are used in combination, the combination and ratio thereof may be appropriately selected depending on the purpose.

The blending amount of (A) the polyanion type lithium salt is not particularly limited, and may be appropriately controlled depending on the type thereof. However, typically, it is preferable to control the blending amount thereof so that the molar concentration of lithium atoms in (A) the polyanion type lithium salt ([the number of moles of lithium atoms in (A) the polyanion type lithium salt]/[the volume of (C) the organic solvent]) is preferably 0.1 to 6 mol/L, and more preferably, 0.2 to 3 mol/L. By achieving such a range, the lithium ion secondary battery exhibits further excellent battery performance.

[(B) Boron Compound]

(B) The boron compound is not particularly limited, and specifically, preferable examples include: a boron trifluoride alkyl ether complex such as a boron trifluoride dimethyl ether complex (BF$_3$O(CH3)$_2$), a boron trifluoride diethyl ether complex (BF$_3$O(C$_2$H$_5$)$_2$), a boron trifluoride di-tert-butyl ether complex (BF$_3$O((CH$_3$)$_3$C)$_2$), a boron trifluoride tert-butylmethyl ether complex (BF$_3$O((CH$_3$)$_3$C)(CH$_3$)), and a boron trifluoride tetrahydrofuran complex (BF$_3$OC$_4$H$_8$); a boron trifluoride alkylamine complex such as a boron trifluoride ethylamine complex (BF$_3$NH$_2$C$_2$H$_5$) and a boron trifluoride piperidine complex (BF$_3$NC$_5$H$_{11}$); a boron trifluoride alcohol complex such as a boron trifluoride methanol complex (BF$_3$HOCH$_3$), a boron trifluoride propanol complex (BF$_3$HOC$_3$H$_7$), and a boron trifluoride phenol complex (BF$_3$HOC$_6$H$_5$); and a boron trifluoride sulfide complex such as a boron trifluoride dimethylsulfide complex (BF$_3$S(CH$_3$)$_2$).

It is estimated that (B) the boron compound has a function of accelerating dissociation of lithium ions from anions in (A) the polyanion type lithium salt in the electrolyte membrane to enhance the ion conductivity of the electrolyte membrane and the lithium ion transference number. Here, "the lithium ion transference number" indicates "a ratio of ion conductivity by lithium ions to the entire ion conductivity", and is preferably closer to 1, for example, for the electrolyte membrane of the lithium ion secondary battery.

As (B) the boron compound, one type may be used alone, or two or more types may be used in combination.

In the case where two or more types are used in combination, the combination and ratio thereof may be appropriately selected depending on the purpose.

In the present invention, it is preferable that (B) the boron compound be one or more types selected from the group consisting of the boron trifluoride alkyl ether complex and the boron trifluoride alcohol complex.

The blending amount of (B) the boron compound is not particularly limited, and may be appropriately controlled depending on the type of (B) the boron compound or (A) the polyanion type lithium salt. Typically, the molar ratio of [the blending amount (the number of moles) of (B) the boron compound]/[the number of moles of lithium atoms in (A) the polyanion type lithium salt] is preferably 0.3 or higher and is more preferably 0.7 or higher. By achieving such a range, the lithium ion secondary battery exhibits further excellent battery performance. In addition, the upper limit of the molar ratio is not particularly limited as long as the effect of the present invention is not hindered, and is preferably 2, and more preferably 1.5.

[(C) Organic Solvent]

(C) The organic solvent is not particularly limited, and specifically, preferable examples include: a carbonic ester compound such as ethylene carbonate, propylene carbonate, butylene carbonate, dimethyl carbonate, methyl ethyl carbonate, diethyl carbonate, and vinylene carbonate; a lactone compound such as γ-butyrolactone; a carboxylic ester compound such as methyl formate, methyl acetate, and methyl propionate; an ether compound such as tetrahydrofuran, and dimethoxyethane; and a nitrile compound such as acetonitrile; and a sulfone compound such as sulfolane.

As (C) the organic solvent, one type may be used alone, or two or more types may be used in combination. When two or more types are used in combination, the combination and ratio thereof may be appropriately selected depending on the purpose.

[(D) Matrix Polymer]

In the present invention, it is preferable that the electrolyte further be blended with (D) a matrix polymer, in addition to (A) the polyanion type lithium salt, (B) the boron compound, and (C) the organic solvent.

(D) The matrix polymer is not particularly limited, and well-known polymers in the solid electrolyte field may be appropriately used.

Specifically, preferable examples of (D) the matrix polymer include: a polyether-based polymer such as polyethylene oxide and polypropylene oxide; a fluorine-based polymer such as polyvinyl fluoride, polyvinylidene fluoride, a polyvinylidene fluoride-hexafluoropropylene copolymer, a polyvinylidene fluoride-hexafluoroacetone copolymer, and polytetrafluoroethylene; a polyacrylic polymer such as polymethyl (meth)acrylate, poly(ethyl(meth)acrylate), polyacrylamide, polyacrylate containing ethylene oxide units; polyacrylonitrile; polyphosphazene; and polysiloxane.

As (D) the matrix polymer, one type may be used alone, or two or more types may be used in combination. In the case where two or more types are used in combination, the combination and ratio thereof may be appropriately selected depending on the purpose.

The blending amount of (D) the matrix polymer is not particularly limited, and may be appropriately controlled depending on the type thereof. However, it is preferable that the blending amount of (D) the matrix polymer with respect to the total amount of blended components be 2% to 50% by mass. By causing the blending amount to be equal to or greater than the lower limit, membrane strength of the electrolyte membrane is further enhanced, and by causing the blending amount to be equal to or smaller than the upper limit, the lithium ion secondary battery exhibits further excellent battery performance.

The electrolyte made by blending (A) the polyanion type lithium salt, (B) the boron compound, and (C) the organic solvent and (D) the matrix polymer as necessary is an electrolyte appropriate for an electrolyte membrane that exhibits ion conductivity equal to a gel electrolyte and is excellent in lithium ion transference number, and for manufacture of the electrolyte membrane.

In addition, the electrolyte realizes excellent ion conductivity and lithium ion transference number by using (B) the boron compound in combination.

In addition, in the lithium ion secondary battery of the present invention, a liquid that contains (E) lithium bis(oxalato)borate (hereinafter, sometimes abbreviated to "LiBOB") may come into contact with the surface of the electrodes.

[(E) LiBOB]

In the electrolyte of the present invention, the ratio of (E) LiBOB with respect to the total amount of blended components is preferably 0.2% to 13% by mass, and more preferably, 0.5% to 10% by mass. By causing the ratio to be equal to or greater than the lower limit, cycle characteristics of the lithium ion secondary battery are further enhanced. In addition, by causing the ratio to be equal to or smaller than the upper limit, a higher effect of suppressing precipitation of (E) LiBOB in the electrolyte is obtained, and conduction of lithium ions is more smoothly performed, thereby obtaining further excellent battery performance.

The liquid comes into contact with the surface of any one of or both the positive electrode and the negative electrode, but preferably comes into contact with at least the negative electrode. The electrode with which the liquid comes into contact holds (E) LiBOB on the surface thereof or therein, and thus a stable surface layer which is derived from (E) LiBOB is formed on the electrode surface. As a result, the electrode surface is protected by the surface layer, which is not broken even during charging and discharging, thereby enhancing cycle characteristics of the lithium ion secondary battery.

The liquid that contains (E) LiBOB is preferably a solution that contains (E) LiBOB, and the concentration of (E) LiBOB in the liquid is preferably 0.1 to 0.9 mol/L, and more preferably, 0.2 to 0.7 mol/L. By achieving such a range, (E) LiBOB that is needed to enhance cycle characteristics can be caused to come into contact with the electrode surface more easily.

The solvent component of the liquid is not particularly limited, and may be the same as (C) the organic solvent described above.

In the lithium ion secondary battery of the present invention, since the liquid that contains (E) LiBOB comes into contact with the surface of the electrode, charging and discharging can be repeatedly performed a number of times, so that cycle characteristics are excellent. In addition, in the electrolyte, since (A) the lithium salt and (B) the boron compound are used in combination, sufficient performance to repeatedly perform charging and discharging is provided.

Regarding the amount of the liquid that comes into contact with the surface of the electrode, the amount of (E) LiBOB placed on the surface of the electrode is preferably controlled to be $5 \times 10^{-3}$ to $130 \times 10^{-3}$ mol/m$^2$, and is more preferably controlled to be $10 \times 10^{-3}$ to $80 \times 10^{-3}$ mol/m$^2$. By causing the amount to be equal to or higher than the lower limit, the cycle characteristics of the lithium ion secondary battery are further enhanced. In addition, by causing the amount to be equal to or smaller than the upper limit, conduction of lithium ions is more smoothly performed, thereby obtaining further excellent battery performance.

A method of causing the liquid to come into contact with the surface of the electrode may be appropriately selected from well-known methods, and a method of dropping the liquid onto the surface of the electrode, a method of applying the liquid, and the like may be exemplified.

The liquid that comes into contact is preferably dried, and drying may be performed under atmospheric pressure or under reduced pressure. The drying temperature and the drying time may be arbitrarily controlled.

[(F) Other Components]

The electrolyte of the present invention may also be blended with (F) other components in addition to (A) the lithium salt, (B) the boron compound, and (C) the organic solvent and as necessary, (D) the matrix polymer and (E) LiBOB, in a range that does not impede the effect of the present invention. Examples of (F) the other components include an inorganic filler and a plasticizer.

The inorganic filler is not particularly limited, and specifically, preferable examples include aluminum oxide ($Al_2O_3$), titanium oxide ($TiO_2$), silica dioxide ($SiO_2$), barium titanate, and mesoporous silica.

The blending amount of the inorganic filler is not particularly limited and may be appropriately controlled depending on the type thereof. Typically, the mass ratio of [the blending amount (mass) of the inorganic filler]/[the total amount (mass) of blended components] is preferably 0.02 to 0.3. By achieving such a range, the electrolyte membrane exhibits further excellent ion conductivity regardless of temperature.

The blending amount of the inorganic filler may be greater than the upper limit described above. However, even with a small amount as in the above-mentioned range, a sufficient effect is obtained.

As the inorganic filler, one type may be used alone, or two or more types may be used in combination. In the case where two or more types are used in combination, the combination and ratio thereof may be appropriately selected depending on the purpose.

The plasticizer is not particularly limited, and specifically, preferable examples include oligoethylene oxide such as diethylene glycol dimethyl ether, tetraethylene glycol dimethyl ether, and polyethylene glycol dimethyl ether.

As the plasticizer, one type may be used alone, or two or more types may be used in combination. In the case where two or more types are used in combination, the combination and ratio thereof may be appropriately selected depending on the purpose.

The blending amount of the plasticizer is not particularly limited and may be appropriately controlled depending on the type thereof. For example, the blending amount may be at a degree of 1% to 20% by mass with respect to the total amount of blended components.

[Method of Manufacturing Electrolyte]

The electrolyte can be manufactured by blending (A) the polyanion type lithium salt, (B) the boron compound, and (C) the organic solvent and other components as necessary.

At the timing of blending the components, it is preferable to add and sufficiently mix the components by various means. In addition, in a case of continuously manufacturing the electrolyte membrane of the present invention described later, the organic solvent used at this time may further be added to collectively mix the obtained composition.

The respective components may be sequentially added and mixed, or after adding all the components, mixing thereof may be performed. The blended components may be uniformly dissolved or dispersed, and each of conditions such as addition order, temperature, time, and the like at the time of blending the components may be arbitrarily controlled depending on the types of the blended components.

The method of mixing the respective components is not particularly limited, and for example, well-known methods that use a stirrer, a stirring blade, a ball mill, a stirrer, an ultrasonic disperser, an ultrasonic homogenizer, a rotating and revolving mixer, and the like may be applied.

The mixing conditions such as mixing temperature and mixing time may be appropriately set according to various methods, and typically, the temperature during mixing is preferably 15° C. to 60° C., and the mixing time is preferably 0.5 to 36 hours.

[Method of Manufacturing Secondary Battery]

Using the polyanion type electrolyte membrane, the battery may be manufactured by a general manufacturing method (the electrolyte membrane is molded by being interposed between the positive electrode and the negative electrode). Moreover, the electrolyte may be directly applied to the electrode. By forming the solid electrolyte membrane on the electrode, a separator or nonwoven fabric becomes unnecessary, resulting in enhancement in energy density or a reduction in cost. Here, typically, the electrolytic solution may be added later.

<Electrolyte Membrane>

The electrolyte membrane in the present invention is obtained using the electrolyte.

For example, the electrolyte membrane may be manufactured by applying and drying the electrolyte as it is or a composition obtained by additionally adding an organic solvent for membrane formation to the electrolyte membrane and mixing the resultant. It is preferable that the electrolyte or the composition be poured into a mold or a container, dried, and molded in a desired shape.

The organic solvent added to the electrolyte is not particularly limited, and for example, those that can sufficiently dissolve or disperse any of the blended components may be used. Specific examples thereof include: a nitrile-based solvent such as acetonitrile; an ether-based solvent such as tetrahydrofuran; an amide-based solvent such as dimethylformamide. The organic solvents are appropriate to, for example, dissolve (B) the matrix polymer or disperse (A) the polyanion type lithium salt.

A mixing method after the addition of the organic solvent may be the same as the mixing method during manufacturing of the electrolyte. However, during mixing, it is preferable to sufficiently disperse (A) the polyanion type lithium salt, and in a case of blending (B) the matrix polymer, it is preferable to completely dissolve this.

As the mold or the container, those that can mold the electrolyte membrane in a desired shape may be arbitrarily used, and for example, those made of polytetrafluoroethylene are appropriate.

A method of drying the electrolyte or the composition is not particularly limited, and for example, well-known methods using a dry box, a vacuum desiccator, a vacuum dryer, and the like may be applied.

<Lithium Ion Secondary Battery>

The lithium ion secondary battery of the present invention has the electrolyte membrane disposed between the positive electrode and the negative electrode, and may have the same configuration as a lithium ion secondary battery according to the related art except that the electrolyte membrane described above is used. In addition, a separator may further be provided between the positive electrode and the negative electrode as necessary.

The positive electrode is able to reversibly store and release lithium ions. Although the material thereof is not particularly limited, examples thereof include transition metal oxides such as lithium cobaltate, lithium nickelate, lithium manganate, and olivine-type lithium iron phosphate, and one or more types selected from the group consisting of those materials are preferable.

The negative electrode is able to reversibly store and release lithium ions. Although the material thereof is not particularly limited, examples thereof include carbon-based materials, metal oxides, and the like, which can store and release metal lithium, lithium alloy, and lithium, and one or more types selected from the group consisting of those materials are preferable.

Although the separator is not particularly limited, examples thereof include a microporous membrane or nonwoven fabric made of a polymer, and glass fiber, and one or more types selected from the group consisting of those materials are preferable.

The shape of the lithium ion secondary battery of the present invention is not particularly limited, and may be controlled to various shapes such as cylindrical, angular, coin-like, and sheet-like shapes. For example, a schematic cross-section of an example of the coin-type battery is illustrated in FIG. 1.

The lithium ion secondary battery 1 illustrated here is of a coin type, and is schematically configured by laminating a positive electrode 11, a gel electrolyte (electrolyte membrane) 12, and a negative electrode 13 in a case 14 in this order, and sealing the laminate with a cap 16 via an insulating gasket 15. However, the lithium ion secondary battery illustrated here represents only an example of the present invention, and the present invention is not limited to this illustrated here.

The lithium ion secondary battery of the present invention can be manufactured by well-known methods. For example, the lithium ion secondary battery may be manufactured using the electrolyte membrane and the electrodes in a glove box or a vacuum desiccator under a dry gas atmosphere.

In the lithium ion secondary battery of the present invention, (B) the boron compound accelerates dissociation of lithium ions of (A) the polyanion type lithium salt in the electrolyte membrane. Therefore, excellent ion conductivity is exhibited, and sufficient battery performance is provided.

EXAMPLES

Hereinafter, the present invention will be described in more detail according to specific examples. However, the present invention is not limited to Examples described below.

(1) Chemical Substances Used

Chemical substances used in this example are described as follows:

(A) Raw Materials of Polyanion Type Lithium Salt

Poly(2-acrylamido-2-methyl-1-propanesulfonic acid) (hereinafter, abbreviated to PAMPS) (15% by mass of aqueous solution, a mass-average molecular weight of 2,000,000, manufactured by Aldrich Chemical Company)

Polyacrylic acid (hereinafter, abbreviated to PAA) (a mass-average molecular weight of 5000, manufactured by Wako Pure Chemical Industries, Ltd.)

Lithium hydroxide monohydrate ($LiOH \cdot H_2O$) (manufactured by Aldrich Chemical Company)

(B) Boron Compound

Boron trifluoride diethyl ether complex ($BF_3O(C_2H_5)_2$) (manufactured by Tokyo Chemical Industry Co., Ltd.)

Boron trifluoride di-tert-butyl ether complex ($BF_3O((CH_3)_3C)_2$) (manufactured by Aldrich Chemical Company)

Boron trifluoride piperidinium ($BF_3C_5H_{10}NH$) (manufactured by Aldrich Chemical Company)

(C) Organic Solvent

Ethylene carbonate (hereinafter, abbreviated to EC) (manufactured by Aldrich Chemical Company)

γ-Butyrolactone (hereinafter, abbreviated to GBL) (manufactured by Aldrich Chemical Company)

Propylene carbonate (hereinafter, abbreviated to PC) (manufactured by Aldrich Chemical Company)

(D) Matrix Polymer

Polyvinylidene fluoride-hexapropylene fluoride copolymer (hereinafter, abbreviated to PVdF-HFP) (manufactured by Aldrich Chemical Company)

Polyvinylidene fluoride (hereinafter, abbreviated to PVdF) (manufactured by Aldrich Chemical Company)

Polyethylene oxide (hereinafter, abbreviated to PEO) (a mass-average molecular weight of 6,000,000, manufactured by Aldrich Chemical Company)

(E) LiBOB (Manufactured by Chemtall, Inc., a Purity of 97.4%)

(F) Others

Tetrahydrofuran (hereinafter, abbreviated to THF) (dehydration, manufactured by Aldrich Chemical Company)

(2) Preparation of (A) Polyanion Type Lithium Salt

Preparation of Poly(Lithium Acrylate) (Hereinafter, Abbreviated to PAA-Li)

PAA (10.0 g, 138.8 mmol) was weighed and collected in a round-bottom flask, and this was dissolved in 100 mL of distilled water. To the solution, a solution obtained by dissolving $LiOH.H_2O$ (5.99 g, 139.5 mmol) in 60 ml of distilled water was slowly added dropwise. After stirring at room temperature for 24 hours, the solution was concentrated by using a rotary evaporator. To 500 mL of methanol, the concentrated solution was slowly added dropwise, and precipitated solids were washed again with methanol to obtain white PAA-Li.

Preparation of Poly(Lithium 2-Acrylamido-2-Methyl-1-Propanesulfonate) (PAMPS-Li)

An aqueous solution (33.3 g, 24.1 mmol) containing 15% by mass of PAMPS was weighed and collected in a round-bottom flask, and to the solution a solution obtained by dissolving $LiOH.H_2O$ (1.05 g, 24.6 mmol) in 60 ml of distilled water was slowly added dropwise. After stirring at room temperature for 24 hours, the solution was concentrated by using a rotary evaporator. To 400 mL of 2-propanol, the concentrated solution was slowly added dropwise, and precipitated solids were washed again with 2-propanol to obtain pale yellow PAMPS-Li.

(3) Manufacture of Lithium Ion Secondary Battery

Manufacture of the lithium ion secondary battery (coin-type cell) in Examples and Comparative Examples described below was entirely performed in a dry box or a vacuum desiccator from manufacture of the electrolyte membrane.

Example 1

Manufacture of Electrolyte Membrane

A THF (2.0 g) solution containing 10% by mass of PVdF-HFP, PAA-Li (0.136 g) obtained in (2) described above, $BF_3O(C_2H_5)_2$ (0.248 g), and a mixed solvent (1.80 g) of EC and GBL (EC/GBL=3/7 (volume ratio)) were weighed and collected in a sample bottle, and THF (2 mL) was added thereto, followed by stirring at 25° C. for 24 hours. A predetermined amount of the obtained solution was cast onto a petri dish (a diameter of 7.5 cm) made of polytetrafluoroethylene, on which polyolefin nonwoven fabric (a porosity of 76%) was set. Thereafter, the petri dish was moved into the vacuum desiccator and was dried therein for 24 hours by supplying a dry nitrogen gas at a flow rate of 2 L/min to obtain an electrolyte membrane.

<Manufacture of Coin-Type Cell>

A negative electrode (manufactured by Hohsen Corporation) and a positive electrode (manufactured by Hohsen Corporation) were punched into a disk shape having a diameter of 16 mm. In addition, the electrolyte membrane obtained as above was punched into a disk shape having a diameter of 17 mm. The positive electrode, the electrolyte membrane, and the negative electrode obtained above were laminated in this order in a battery container (CR2032) made of SUS, and furthermore, on the negative electrode, a plate made of SUS (a thickness of 1.5 mm, a diameter of 16 mm) was placed as a cover, thereby manufacturing a coin-type cell.

Moreover, the electrolyte may also be applied on the electrode. In this manner, since the solid electrolyte membrane was formed on the electrode, a separator or nonwoven fabric becomes unnecessary. That is, enhancement in energy density and a reduction in cost are caused. Here, typically, an electrolytic solution may be added later.

Example 2

A THF solution (2.0 g) containing 10% by mass of PVdF-HFP, PAA-Li (0.144 g) obtained in (2) described above, $(BF_3O((CH_3)_3C)_2)$ (0.366 g), and a mixed solvent (1.80 g) of EC and GBL (EC/GBL=3/7 (volume ratio)) were weighed and collected in a sample bottle, and THF (2 mL) was added thereto, and hereinafter, by the same method as that of Example 1, a coin-type cell was manufactured.

Comparative Example 1

A THF solution (2.0 g) containing 10% by mass of PVdF-HFP, PAA-Li (0.120 g) obtained in (2) described above, a mixed solvent (1.80 g) of EC and GBL (EC/GBL=3/7 (volume ratio)) were weighed and collected in a sample bottle, THF (2 mL) was added thereto, and hereinafter, by the same method as that of Example 1, a coin-type cell was manufactured.

(4) Evaluation of Battery Performance

After the coin-type cells of the Examples 1 to 5 and the Comparative Example 1 had reached 4.2 V at a current value of 3.0 mA (1 CA) at 25° C., the coin-type cells were charged until the current value at a constant voltage had attenuated to 0.15 mA. Thereafter, discharging was made to 2.7 V at a current value of 3.0 mA. By repeatedly performing the charging and discharging cycle, for each of the coin-type cells, an actual capacity ratio of the $10^{th}$ cycle with respect to a theoretical capacity ([an actual capacity (mAh) of the $10^{th}$ cycle of the coin-type cell]/[the theoretical capacity (mAh) of the coin-type cell]) was obtained to evaluate battery performance. The results are shown in Table 1.

TABLE 1

|  | Blended components of electrolyte (g) | | | | Capacity ratio of lithium ion |
| --- | --- | --- | --- | --- | --- |
|  | (A) | (B) | (C) | (D) | secondary battery |
| Example 1 | PAA-Li (0.136) | $BF_3O(C_2H_5)_2$ (0.248) | EC/GBL = 3/7 (v/v) (1.8) | PVdF-HFP (0.2) | 0.89 |
| Example 2 | PAA-Li (0.144) | $BF_3((CH_3)_3C)_2$ (0.366) | EC/GBL = 3/7 (v/v) (1.8) | PVdF-HFP (0.2) | 0.88 |
| Comparative | PAA-Li | — | EC/GBL = 3/7 | PVdF-HFP | — |

TABLE 1-continued

| | Blended components of electrolyte (g) | | | | Capacity ratio of lithium ion secondary battery |
|---|---|---|---|---|---|
| | (A) | (B) | (C) | (D) | |
| Example 1 | (0.120) | | (v/v) (1.8) | (0.2) | (charging and discharging disable) |

As is apparent from Table 1, the lithium ion secondary battery of the present invention which uses the polyanion type lithium salt, the boron compound, and the organic solvent had sufficient battery performance.

Next, a lithium ion battery in which a liquid containing (E) LiBOB in contact with the surface of the electrode was produced.

Example 3

Manufacture of Electrolyte Membrane

A THF solution containing 10% by mass of PVdF was prepared. In addition, PAA-Li (2.00 g) obtained in (2) described above and $BF_3O(C_2H_5)_2$ (3.64 g) were mixed with THF (14.36 g), thereby preparing a THF solution of PAA-Li and $BF_3O(C_2H_5)_2$.

The THF solution (1.0 g) containing 10% by mass of PVdF, the THF solution (0.682 g) of PAA-Li and $BF_3O(C_2H_5)_2$, and a mixed solvent (0.9 g) of EC and GBL (EC/GBL=3/7 (volume ratio)) were weighed and collected in a sample bottle, followed by stirring at 25° C. for 24 hours. A predetermined amount of the obtained solution was cast onto a petri dish (a diameter of 5 cm) made of polytetrafluoroethylene. Thereafter, the petri dish was moved into the vacuum desiccator and was dried therein for 24 hours by supplying a dry nitrogen gas at a flow rate of 2 L/min to remove THF to obtain an electrolyte membrane. The blending amount of each of the components is shown in Table 2. In addition, the number of moles (mmol) of lithium atoms in (A) PAA-Li blended is the same as the number of moles (mmol) of (A) PAA-Li in Table 2.

<Manufacture of Lithium Ion Secondary Battery>

Manufacture of the lithium ion secondary battery (coin-type cell) in Examples and Comparative Examples described below was entirely performed in a dry box or a vacuum desiccator from manufacture of the electrolyte membrane.

A negative electrode (manufactured by Hohsen Corporation) and a positive electrode (manufactured by Hohsen Corporation) were punched into a disk shape having a diameter of 10 mm. In addition, the electrolyte membrane obtained as above was punched into a disk shape having a diameter of 17 mm. In addition, LiBOB (0.4974 g) was dissolved in a mixed solvent (5 mL) of EC and GBL (EC/GBL=3/7 (volume ratio)) to prepare a LiBOB solution having a concentration of 0.5 mol/L, and 5 μL of the solution was applied to the surface of the negative electrode using a dropper. In addition, the positive electrode, the electrolyte membrane obtained as above, and the negative electrode to which the LiBOB solution was applied were laminated in this order in a battery container (CR2032) made of SUS so that the surface of the negative electrode to which the LiBOB solution was applied comes into contact with the electrolyte membrane, and furthermore, on the surface of the negative electrode to which the LiBOB solution was not applied, a plate made of SUS (a thickness of 1.5 mm, a diameter of 16 mm) was placed as a cover, thereby manufacturing a coin-type cell.

Example 4

A coin-type cell was manufactured by the same method as that in Example 3 except that the LiBOB solution was applied to the positive electrode instead of the negative electrode.

Comparative Example 2

A coin-type cell was manufactured by the same method as that in Example 3 except that the LiBOB solution was not applied.

<Evaluation of Cycle Characteristics>

The coin-type cells of the Examples and the Comparative Examples were charged to 4.2 V at a current value of 1 C at 25° C., and thereafter were discharged to 2.7 V at a current value of 1 C. By repeatedly performing the charging and discharging cycle, for a theoretical capacity of 1.5 mA, the number of cycles by which charging and discharging can be performed until 1.2 mA (80% of the theoretical capacity) had been reached was obtained. The results are shown in Table 3.

TABLE 2

| | Blended components in electrolyte membrane (amount) | | | |
|---|---|---|---|---|
| | (A) | (B) | (C) | (D) |
| Example 3 | PAA-Li (68 mg) (0.87 mmol) | PVdF (100 mg) | $BF_3O(C_2H5)_2$ (124 mg) (0.87 mmol) | EC/GBL (900 mg) |
| Example 4 | PAA-Li (68 mg) (0.87 mmol) | PVdF (100 mg) | $BF_3O(C_2H_5)_2$ (124 mg) (0.87 mmol) | EC/GBL (900 mg) |
| Comparative Example 2 | PAA-Li (68 mg) (0.87 mmol) | PVdF (100 mg) | $BF_3O(C_2H_5)_2$ (124 mg) (0.87 mmol) | EC/GBL (900 mg) |

TABLE 3

| | (E) | | |
|---|---|---|---|
| | Applied surface | Applying amount (mol/m$^2$) | The number of cycles (rounds) |
| Example 3 | Negative electrode | $3.2 \times 10^{-2}$ | 122 |
| Example 4 | Positive electrode | $3.2 \times 10^{-2}$ | 36 |
| Comparative Example 2 | — | — | 20 |

As is apparent from the results, by using LiBOB, and particularly, by applying the LiBOB solution to the negative electrode, the lithium ion secondary battery which uses new lithium salts and has excellent cycle characteristics was obtained. In addition, the lithium ion secondary battery had sufficient charging and discharging characteristics.

Example 5

Manufacture of Electrolyte Membrane

A THF solution containing 10% by mass of PVdF was prepared. In addition, PAA-Li (2.00 g) obtained in (2) described above and $BF_3O(C_2H_5)_2$ (3.64 g) were mixed with THF (14.36 g), thereby preparing a THF solution of PAA-Li and $BF_3O(C_2H_5)_2$.

The THF solution (1.0 g) containing 10% by mass of PVdF, the THF solution (0.682 g) of PAA-Li and $BF_3O(C_2H_5)_2$, LiBOB (0.01 g), and a mixed solvent (0.9 g) of EC and GBL (EC/GBL=3/7 (volume ratio)) were weighed and collected in a sample bottle, followed by stirring at 25° C. for 24 hours. A predetermined amount of the obtained solution was cast onto a petri dish (a diameter of 5 cm) made of polytetrafluoroethylene. Thereafter, the petri dish was moved into the vacuum desiccator and was dried therein for 24 hours by supplying a dry nitrogen gas at a flow rate of 2 L/min to remove THF to obtain an electrolyte membrane. The blending amount of each of the components is shown in Table 4. In addition, in Table 4, "(E) ratio (% by mass)" represents "a blending ratio of (E) LiBOB with respect to the total amount of the blended components". In addition, the number of moles (mmol) of lithium atoms in (A) PAA-Li blended is the same as the number of moles (mmol) of (A) PAA-Li in Table 4.

<Manufacture of Lithium Ion Secondary Battery>

A negative electrode (manufactured by Hohsen Corporation) and a positive electrode (manufactured by Hohsen Corporation) were punched into a disk shape having a diameter of 10 mm. In addition, the electrolyte membrane obtained as above was punched into a disk shape having a diameter of 17 mm. The obtained positive electrode, the electrolyte membrane, and the negative electrode were laminated in this order in a battery container (CR2032) made of SUS, and furthermore, on the negative electrode, a plate made of SUS (a thickness of 1.5 mm, a diameter of 16 mm) was placed as a cover, thereby manufacturing a coin-type cell.

Examples 6 and 7, Comparative Example 3

Electrolyte membranes and coin-type cells were manufactured by the same method as that in Example 5 except that the blending amount of each of components is as in Table 1.

<Evaluation of Cycle Characteristics>

The coin-type cells of the Examples and the Comparative Examples were charged to 4.2 V at a current value of 1 C at 25° C., and thereafter were discharged to 2.7 V at a current value of 1 C. By repeatedly performing the charging and discharging cycle, for a theoretical capacity of 1.5 mA, the number of cycles by which charging and discharging can be performed until 1.2 mA (80% of the theoretical capacity) had been reached was obtained. The results are shown in Table 5.

TABLE 4

| | Blended components (amount) | | | | |
|---|---|---|---|---|---|
| | (A) | (B) | (C) | (D) | (E) |
| Example 5 | PAA-Li (68 mg) (0.87 mmol) | PVdF (100 mg) | $BF_3O(C_2H_5)_2$ (124 mg) (0.87 mmol) | EC/GBL (900 mg) | LiBOB (10 mg) (0.05 mmol) |
| Example 6 | PAA-Li (68 mg) (0.87 mmol) | PVdF (100 mg) | $BF_3O(C_2H_5)_2$ (124 mg) (0.87 mmol) | EC/GBL (900 mg) | LiBOB (30 mg) (0.16 mmol) |
| Example 7 | PAA-Li (68 mg) (0.87 mmol) | PVdF (100 mg) | $BF_3O(C_2H_5)_2$ (124 mg) (0.87 mmol) | EC/GBL (900 mg) | LiBOB (80 mg) (0.41 mmol) |
| Comparative Example 3 | PAA-Li (68 mg) (0.87 mmol) | PVdF (100 mg) | $BF_3O(C_2H_5)_2$ (124 mg) (0.87 mmol) | EC/GBL (900 mg) | — |

TABLE 5

| | (E) Ratio (% by mass) | The number of cycles (rounds) |
|---|---|---|
| Example 5 | 0.8 | 32 |
| Example 6 | 2.5 | 40 |
| Example 7 | 6.3 | 45 |
| Comparative Example 3 | 0 | 20 |

As is apparent from the results, by the new electrolyte using LiBOB, the lithium ion secondary battery having excellent cycle characteristics was obtained. In addition, in any of the Examples, no precipitation of LiBOB was admitted, the lithium ion secondary battery had sufficient charging and discharging characteristics, and cycle characteristics were further excellent as the blending amount of LiBOB was higher.

In addition, various electrolyte membranes were produced and evaluated. Examples and results thereof are described as follows.

(B2) Preparation of (A) Polyanion Type Lithium Salt (B2-1) Preparation of Poly(Lithium Acrylate) (Hereinafter, Abbreviated to PAA-Li)

PAA (10.0 g, 138.8 mmol) was weighed and collected in a round-bottom flask, and this was dissolved in 100 mL of distilled water. To the solution, a solution obtained by dissolving $LiOH.H_2O$ (5.99 g, 139.5 mmol) in 60 ml of distilled water was slowly added dropwise. After stirring at room temperature for 24 hours, the solution was concentrated by using a rotary evaporator. The concentrated solution was slowly added dropwise to 500 mL of methanol, and precipitated solids were washed again by methanol to obtain white PAA-Li.

(B2-2) Preparation of Poly(Lithium 2-Acrylamido-2-Methyl-1-Propanesulfonate) (PAMPS-Li)

An aqueous solution containing 15% by mass of PAMPS (33.3 g, 24.1 mmol) was weighed and collected in a round-bottom flask, and a solution obtained by dissolving $LiOH.H_2O$ (1.05 g, 24.6 mmol) in 60 ml of distilled water was slowly added dropwise onto the resultant. After stirring at room temperature for 24 hours, the solution was concentrated by using a rotary evaporator. The concentrated solution was slowly added dropwise to 400 mL of 2-propanol, and precipitated solids were washed again by 2-propanol to obtain pale yellow PAMPS-Li.

(B3) Production of Electrolyte Membrane

Manufacture of the electrolyte membranes in Examples and Comparative Examples described below was entirely performed in a dry box or a vacuum desiccator.

Example 8

Production of Gel Electrolyte Membrane Containing PEO, PAA-Li, and $BF_3O(C_2H_5)_2$ PEO (0.50 g), PAA-Li (0.018 g) obtained in (B2-1) described above, $BF_3O(C_2H_5)_2$ (0.032 g), and a mixed solvent (0.52 g) of EC and GBL (EC:GBL=30:70 (volume ratio)) as an organic solvent were weighed and collected in a sample bottle, and acetonitrile (12 mL) was added thereto, followed by stirring at room temperature for 24 hours. After confirming that PEO was completely dissolved in acetonitrile and PAA-Li was sufficiently dispersed in the solution, the obtained dispersed solution was cast onto a petri dish (a diameter of 5.0 cm) made of polytetrafluoroethylene. Thereafter, the petri dish was moved into the vacuum desiccator and was dried therein for 24 hours by supplying dry nitrogen at a flow rate of 2 L/min to obtain an electrolyte membrane. The ratio of the total blending amount of (A) the polyanion type lithium salt and (D) the matrix polymer to the blending amount of (C) the organic solvent ([(A)+(D)]:(C) (mass ratio)) and the molar ratio of [the blending amount (the number of moles) of (B) the boron compound]/[the number of moles of lithium atoms in (A) the polyanion type lithium salt] ((B)/Li (molar ratio)) are shown in Table 6. This is the same in the following Examples and Comparative Examples.

Comparative Example 4

Production of Gel Electrolyte Membrane Containing PEO and PAA-Li

PEO (0.50 g), PAA-Li (0.018 g) obtained in (B2-1) described above, and a mixed solvent (0.52 g) of EC and GBL (EC:GBL=30:70 (volume ratio)) as an organic solvent were weighed and collected in a sample bottle, acetonitrile (12 mL) was added thereto, and thereafter, by the same method as that of Example 8, an electrolyte membrane was manufactured.

Example 9

Production of Gel Electrolyte Membrane (B1) Containing PVdF-HFP, PAA-Li, and $BF_3O(C_2H_5)_2$ A THF solution (2.0 g) containing 10% by mass of PVdF-HFP, PAA-Li (0.079 g) obtained in (B2-1) described above, $BF_3O(C_2H_5)_2$ (0.072 g), and a mixed solvent (1.12 g) of EC and GBL (EC:GBL=30:70 (volume ratio)) as an organic solvent were weighed and collected in a sample bottle, and tetrahydrofuran (2 mL) was added thereto, followed by stirring at room temperature for 48 hours. A predetermined amount of the obtained solution was cast onto a petri dish (a diameter of 7.5 cm) made of polytetrafluoroethylene, on which polyolefin nonwoven fabric (a porosity of 76%) was set. Thereafter, the petri dish was moved into the vacuum desiccator and was dried therein for 24 hours by supplying dry nitrogen at a flow rate of 2 L/min to obtain an electrolyte membrane.

Example 10

Production of Gel Electrolyte Membrane Containing PVdF-HFP, PAMPS-Li, and $BF_3O(C_2H_5)_2$ A THF solution (2.0 g) containing 10% by mass of PVdF-HFP, PAMPS-Li (0.322 g) obtained in (B2-2) described above, $BF_3O(C_2H_5)_2$ (0.11 g), and a mixed solvent (2.09 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Comparative Example 5

Production of Gel Electrolyte Membrane Containing PVdF-HFP and PAA-Li

A tetrahydrofuran solution (2.5 g) containing 10% by mass of PVdF-HFP, PAA-Li (0.067 g) obtained in (B2-1) described above, and a mixed solvent (1.26 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Example 11

Production of Gel Electrolyte Membrane (B2) Containing PVdF-HFP, PAA-Li, and $BF_3O(C_2H_5)_2$ A tetrahydrofuran solution (2.5 g) containing 10% by mass of PVdF-HFP, PAA-Li (0.086 g) obtained in (B2-1) described above, $BF_3O(C_2H_5)_2$ (0.016 g), and a mixed solvent (1.0 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Example 12

Production of Gel Electrolyte Membrane (B3) Containing PVdF-HFP, PAA-Li, and $BF_3O(C_2H_5)_2$ A tetrahydrofuran solution (2.5 g) containing 10% by mass of PVdF-HFP, PAA-Li (0.089 g) obtained in (B2-1) described above, $BF_3O(C_2H_5)_2$ (0.048 g), and a mixed solvent (1.0 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Example 13

Production of Gel Electrolyte Membrane (B4) Containing PVdF-HFP, PAA-Li, and $BF_3O(C_2H_5)_2$ A tetrahydrofuran solution (2.5 g) containing 10% by mass of PVdF-HFP, PAA-Li (0.092 g) obtained in (B2-1) described above, $BF_3O(C_2H_5)_2$ (0.10 g), and a mixed solvent (1.0 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Example 14

Production of Gel Electrolyte Membrane (B5) Containing PVdF-HFP, PAA-Li, and $BF_3O(C_2H_5)_2$ A tetrahydrofuran solution (2.5 g) containing 10% by mass of PVdF-HFP, PAA-Li (0.10 g) obtained in (B2-1) described above, $BF_3O(C_2H_5)_2$ (0.18 g), and a mixed solvent (1.0 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Example 15

Production of Gel Electrolyte Membrane (B6) Containing PVdF-HFP, PAA-Li, and $BF_3O(C_2H_5)_2$ A tetrahydrofuran solution (2.0 g) containing 10% by mass of PVdF-HFP, PAA-Li (0.088 g) obtained in (B2-1) described above, $BF_3O(C_2H_5)_2$ (0.24 g), and a mixed solvent (0.8 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Example 16

Production of Gel Electrolyte Membrane (B7) Containing PVdF-HFP, PAA-Li, and $BF_3O(C_2H_5)_2$ A tetrahydrofuran solution (2.0 g) containing 10% by mass of PVdF-HFP, PAA-Li (0.098 g) obtained in (B2-1) described above, $BF_3O(C_2H_5)_2$ (0.36 g), and a mixed solvent (0.8 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Example 17

Production of Gel Electrolyte Membrane Containing PVdF-HFP, PAA-Li, and $BF_3C_5H_{10}NH$ A tetrahydrofuran solution (2.0 g) containing 10% by mass of PVdF-HFP, PAA-Li (0.088 g) obtained in (B2-1) described above, $BF_3C_5H_{10}NH$ (0.17 g), and a mixed solvent (1.15 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

Example 18

Production of Gel Electrolyte Membrane Containing PVdF-HFP, PAA-Li, and $BF_3O((CH3)_3C)_2$ A tetrahydrofuran solution (2.0 g) containing 10% by mass of PVdF-HFP, PAA-Li (0.094 g) obtained in (B2-1) described above $BF_3O((CH3)_3C)_2$ (0.24 g), and a mixed solvent (1.18 g) of EC and GBL (EC:GBL=30:70 (volume ratio)) as an organic solvent were weighed and collected in a sample bottle, tetrahydrofuran (2 mL) was added thereto, and thereafter, by the same method as in that of Example 9, an electrolyte membrane was manufactured.

(4) Measurement of Ion Conductivity of Electrolyte Membrane

The electrolyte membranes obtained as above were cut out into a predetermined size so as to be put in a spacer with a hole having an inside diameter of 5 mm, and the cut-outs were assembled into cells by being nipped by stainless plates. In addition, the cells were connected to a complex AC impedance-measuring device to measure resistance values from a Nyquist plot. Here, after the cells were put in a thermostatic bath set to 80° C. to cause the electrolyte and the stainless plate to fit with each other, the temperature was reduced, and resistance values at a predetermined temperature were measured. The resistance values at each temperature were measured after holding the cells at the corresponding temperature for 30 minutes. In addition, from the obtained resistance values, according to the following Formula (I), the ion conductivities (σ) (S/cm) of the electrolyte membranes were calculated. The ion conductivities of the electrolyte membranes in the Examples 8 to 18 and the Comparative Examples 4 and 5 are shown in Table 2.

$$\sigma = l/s \cdot R \qquad (I)$$

(in the formula, l represents the thickness (cm) of the specimen (electrolyte membrane), s represents the area ($cm^2$) of the specimen (electrolyte membrane), and R represents the resistance value (Ω))

(5) Measurement of Lithium Ion Transference Number (t+) of Electrolyte Membrane

The lithium ion transference number of the obtained electrolyte membrane was obtained by using both direct current polarization measurement and complex impedance measurement.

That is, the electrolyte membranes were cut out into a predetermined size so as to be put in a spacer with a hole having an inside diameter of 16 mm, and the cut-outs were assembled into cells by being nipped between Li plates. In addition, the cells were connected to a complex AC impedance-measuring device, were put in a thermostatic bath set to 60° C. for 1 hour and were thereafter left for 1 or more hours by changing the temperature to 25° C. Thereafter, measurement was started. The measurement method is as follows. First, complex impedance measurement was performed, and a resistance value (hereinafter, abbreviated to R0) was estimated. Thereafter, direct current polarization measurement was performed, and after confirming that the current value became constant (hereinafter, an initial current value and a current value which became constant were respectively abbreviated to I0 and Is), complex impedance measurement was performed again to estimate a resistance value (hereinafter, abbreviated to Rs). In addition, the lithium ion transference number was calculated from the Evans' formula expressed by the above Formula (II). The transference numbers (t+) of lithium ions of the electrolyte membranes in the Examples 8 to 18 and the Comparative Examples 4 and 5 are shown in Table 7.

$$t+ = Is(\Delta V - I0 \cdot R0)/I0(\Delta V - Is \cdot Rs) \qquad (II)$$

(in the formula, ΔV represents the applied voltage, and R0, Rs, I0, and Is are as above)

TABLE 6

|  | [(A) + (D)]:(C) (mass ratio) | (B)/Li (molar ratio) |
| --- | --- | --- |
| Example 8 | 50:50 | 1.0 |
| Example 9 | 20:80 | 0.5 |
| Example 10 | 20:80 | 0.5 |
| Example 11 | 25:75 | 0.1 |
| Example 12 | 25:75 | 0.2 |
| Example 13 | 26:74 | 0.6 |
| Example 14 | 26:74 | 1.0 |
| Example 15 | 27:73 | 1.5 |
| Example 16 | 27:73 | 2.0 |
| Example 17 | 20:80 | 1.0 |
| Example 18 | 20:80 | 1.0 |
| Comparative Example 4 | 50:50 | 0 |
| Comparative Example 5 | 20:80 | 0 |

TABLE 7

|  | Ion conductivity (σ) (mS/cm) | | Lithium ion transference number (t+) |
| --- | --- | --- | --- |
|  | 30° C. | 20° C. | 25° C. |
| Example 8 | 0.57 | 0.53 | 0.77 |
| Example 9 | 2.03 | 1.78 | 0.80 |
| Example 10 | 2.13 | 1.90 | 0.66 |
| Example 11 | 0.23 | 0.19 | 0.78 |
| Example 12 | 0.95 | 0.86 | 0.76 |
| Example 13 | 1.49 | 1.31 | 0.81 |
| Example 14 | 1.13 | 0.94 | 0.84 |
| Example 15 | 0.59 | 0.53 | 0.96 |
| Example 16 | 0.80 | 0.51 | 0.87 |
| Example 17 | 1.32 | 1.15 | 0.54 |
| Example 18 | 1.83 | 1.63 | 0.91 |
| Comparative Example 4 | 0.0007 | 0.0005 | 0.05 |
| Comparative Example 5 | 0.013 | 0.0095 | 0.72 |

From Example 8, it was confirmed that when PAA-Li, $BF_3O(C_2H_5)_2$, and the organic solvent were blended with the matrix polymer, in the electrolyte membrane, high ion conductivities and transference numbers of lithium ions could be realized. In addition, it was confirmed from the Examples 9 to 17 that, in the combinations and blending ratios of various blended components, high ion conductivities and lithium ion transference number as in Example 8 could be realized. In addition, it was confirmed from the Comparative Example 4 that, without $BF_3O(C_2H_5)_2$, the ion conductivity was further significantly reduced. It is assumed that this is because PAA-Li could not be sufficiently dissociated. In the Comparative Example 5, as in the Comparative Example 4, the ion conductivity was significantly reduced.

INDUSTRIAL APPLICABILITY

The present invention can be used in the field of lithium ion secondary batteries.

REFERENCE SIGNS LIST 1 lithium ion secondary battery
11 positive electrode
12 electrolyte membrane
13 negative electrode
14 case
15 insulating gasket
16 cap

The invention claimed is:
1. A lithium ion secondary battery comprising:
a positive electrode and a negative electrode into which, and from which, lithium ions can be introduced and be discharged reversibly, and an electrolyte membrane placed therebetween,
wherein the electrolyte membrane is obtained using an electrolyte comprising
(A) a polyanion type lithium salt,
(B) a boron compound,
(C) an organic solvent, and
(D) a matrix polymer;
wherein the molar ratio of [(B) the boron compound]/ [lithium atoms in (A) the polyanion type lithium salt] is 0.3 to 2; and wherein
(A) the polyanion type lithium salt is a lithium salt of a polycarboxylic acid, and
(B) the boron compound is a boron trifluoride-alkyl ether complex.
2. The lithium ion secondary battery according to claim 1, wherein (C) the organic solvent is one or more types selected from the group consisting of a carbonic ester compound, a lactone compound, and a sulfone compound.
3. The lithium ion secondary battery according to claim 1, wherein (D) the matrix polymer is one or more types selected from the group consisting of a fluorine-based polymer, polyphosphazene, and polysiloxane.
4. The lithium ion secondary battery according to claim 1, wherein (D) the matrix polymer is a fluorine-based polymer.
5. The lithium ion secondary battery according to claim 1, which further comprises (E) lithium bis(oxalato)borate which is present in at least one state selected from
a state wherein (E) lithium bis(oxalato)borate is contained in the electrolyte membrane, and
a state wherein a liquid containing (E) lithium bis(oxalato)borate is applied to the positive electrode or the negative electrode.
6. The lithium ion secondary battery according to claim 1, wherein the electrolyte further comprises (F) an inorganic filler.
7. The lithium ion secondary battery according to claim 1, wherein (B) the boron compound is one or more types selected from the group consisting of a boron trifluoride dimethyl ether complex ($BF_3O(CH_3)_2$), a boron trifluoride diethyl ether complex ($BF_3O(C_2H_5)_2$), a boron trifluoride di-tert-butyl ether complex ($BF_3O((CH_3)_3C)_2$), a boron trifluoride tert-butylmethyl ether complex ($BF_3O((CH_3)_3C)(CH_3)$), and a boron trifluoride tetrahydrofuran complex ($BF_3OC_4H_8$).
8. The lithium ion secondary battery according to claim 7, wherein (B) the boron compound is a boron trifluoride di-tert-butyl ether complex ($BF_3O((CH_3)_3C)_2$).
9. The lithium ion secondary battery according to claim 7, wherein (A) the polyanion type lithium salt is one or more types selected from the group consisting of a lithium salt of a polycarboxylic acid and a lithium salt of a polysulfonic acid.
10. The lithium ion secondary battery according to claim 7, wherein (C) the organic solvent is one or more types selected from the group consisting of a carbonic ester compound, a lactone compound, and a sulfone compound.

11. The lithium ion secondary battery according to claim 7, wherein (D) the matrix polymer is one or more types selected from the group consisting of a fluorine-based polymer, polyphosphazene and polysiloxane.

12. The lithium ion secondary battery according to claim 11, wherein (D) the matrix polymer is a fluorine-based polymer.

13. The lithium ion secondary battery according to claim 7, which further comprises (E) lithium bis(oxalato)borate which is present in at least one state selected from a state wherein (E) lithium bis(oxalato)borate is contained in the electrolyte membrane and a state wherein a liquid containing (E) lithium bis(oxalato)borate is applied to the positive electrode or the negative electrode.

14. The lithium ion secondary battery according to claim 7, wherein the electrolyte further comprises (F) an inorganic filler.

15. The lithium ion secondary battery according to claim 1, wherein (A) the polyanion type lithium salt is one or more types selected from the group consisting of poly(lithium (meth)acrylate), lithium polymaleate, lithium polyfumarate, lithium polymuconate, lithium polysorbate, a poly(acrylonitrile-butadiene-lithium acrylate) copolymer, a poly(tert-butylacrylate-ethyl acrylate-lithium methacrylate) copolymer, a poly(ethylene-lithium acrylate) copolymer, and a poly(methyl methacrylate-lithium methacrylate) copolymer.

\* \* \* \* \*